Jan. 19, 1965   G. J. PELLETIER   3,165,970
PHOTOGRAPHIC PROJECTION EASEL
Filed April 24, 1962   3 Sheets-Sheet 1
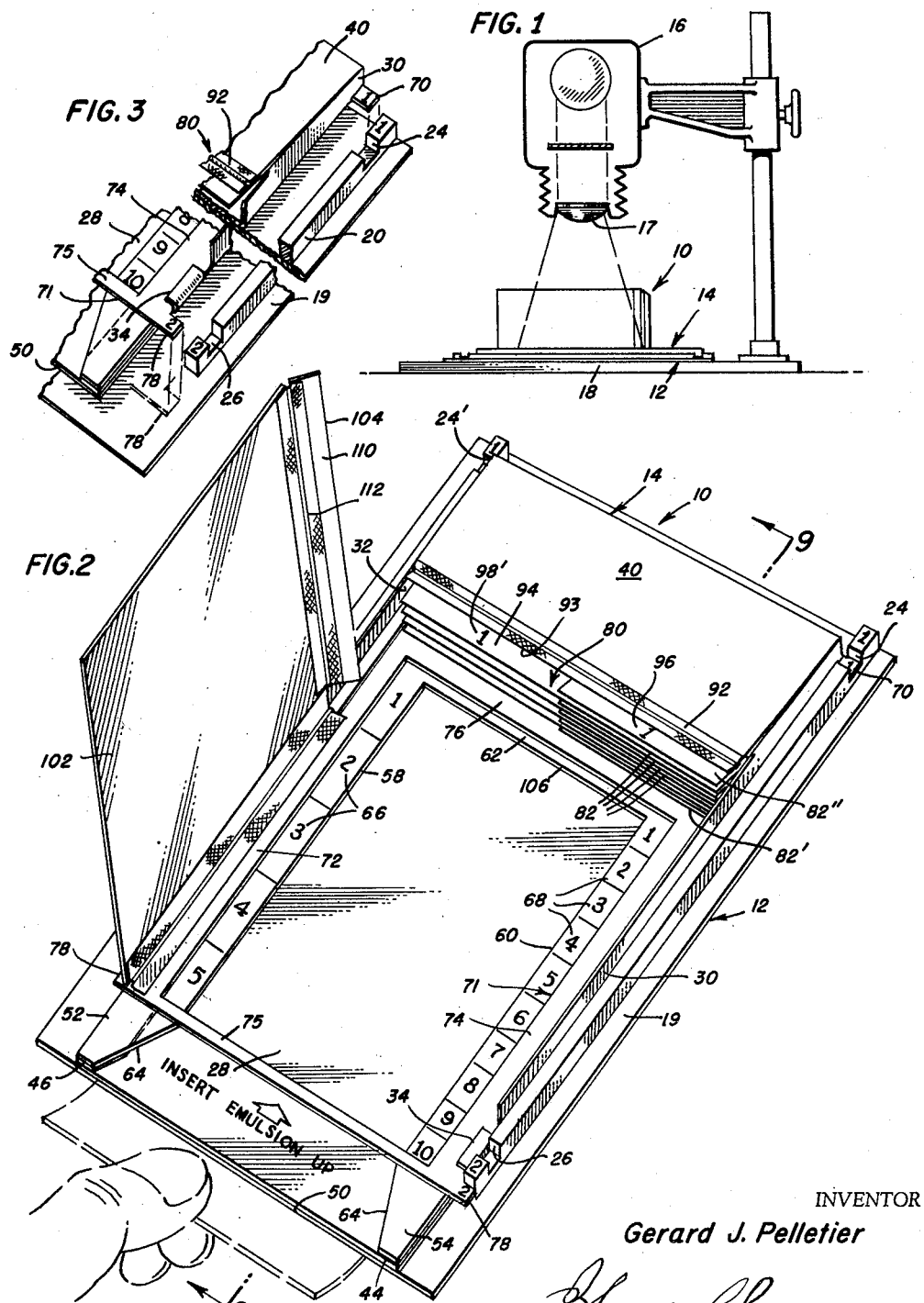
INVENTOR
Gerard J. Pelletier
BY *Frederick C. Bromley*
ATTORNEY

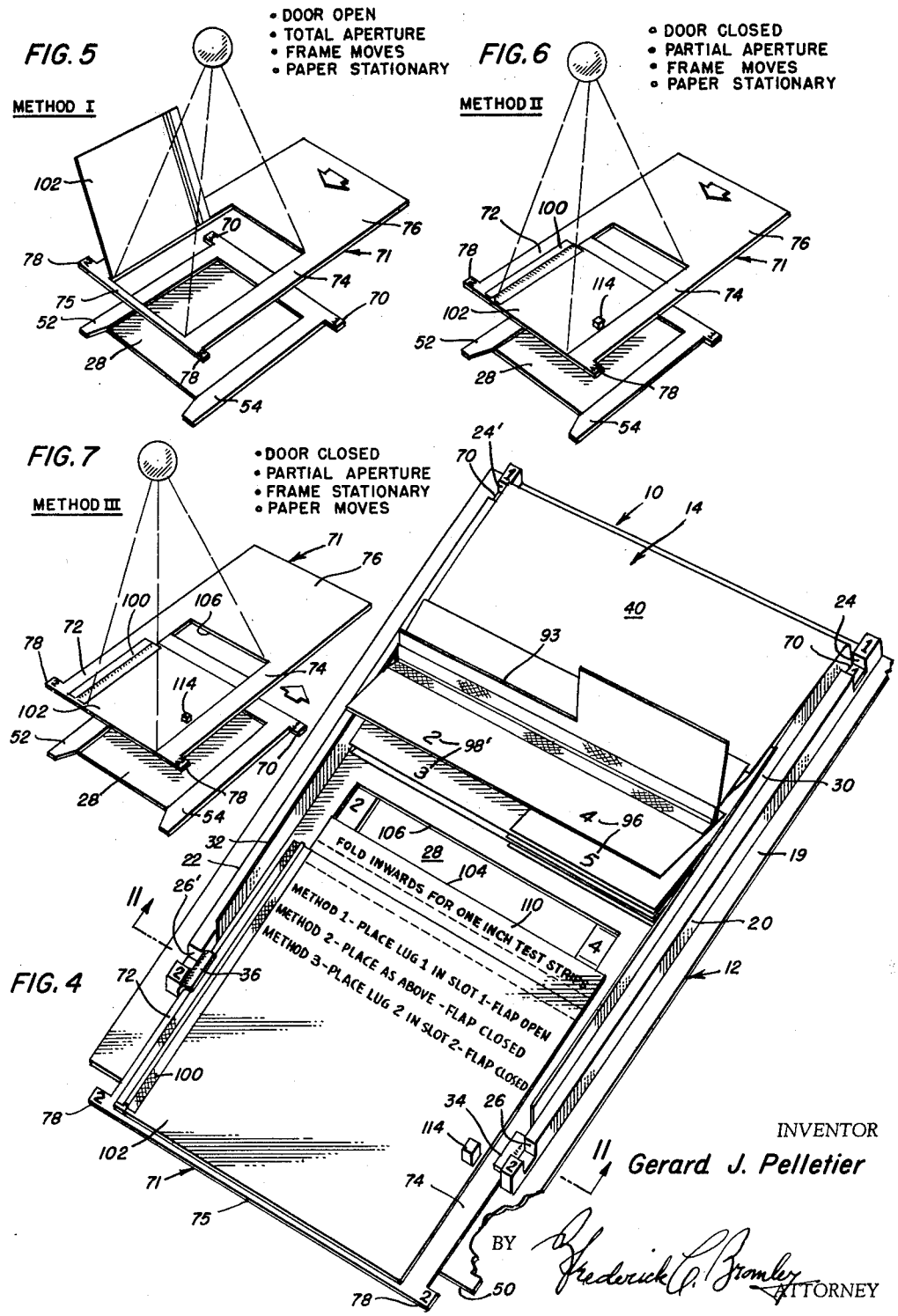

Jan. 19, 1965 G. J. PELLETIER 3,165,970
PHOTOGRAPHIC PROJECTION EASEL
Filed April 24, 1962 3 Sheets-Sheet 3
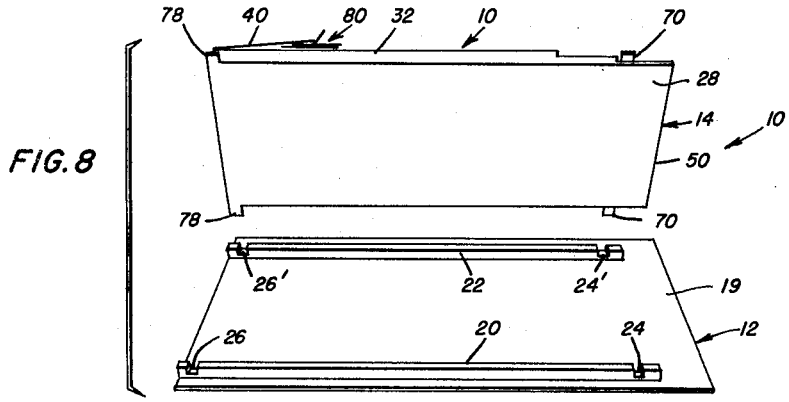
FIG. 8
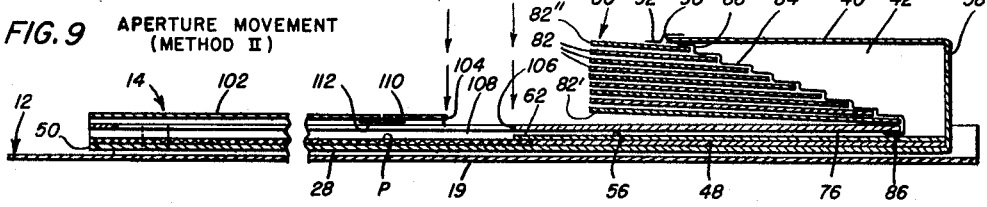
FIG. 9 APERTURE MOVEMENT (METHOD II)
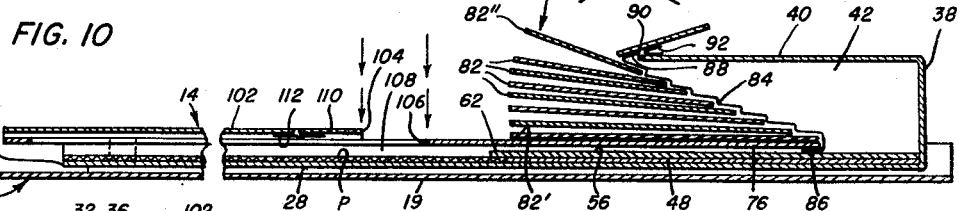
FIG. 10
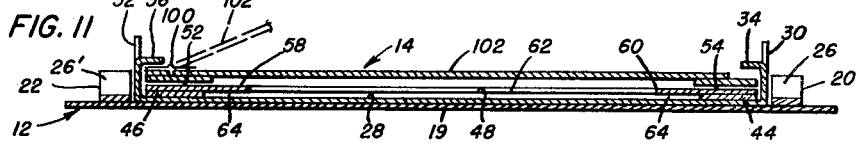
FIG. 11
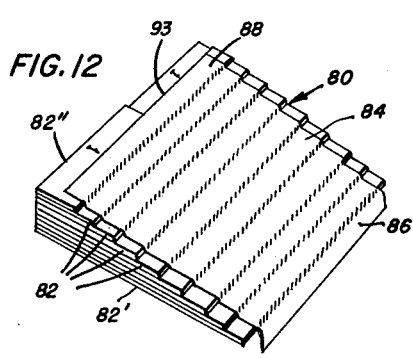
FIG. 12
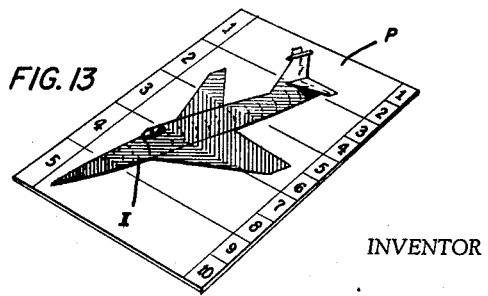
FIG. 13
INVENTOR
Gerard J. Pelletier
BY *Frederick C. Bromley*
ATTORNEY

United States Patent Office 3,165,970
Patented Jan. 19, 1965

3,165,970
PHOTOGRAPHIC PROJECTION EASEL
Gerard J. Pelletier, 2 Rex Gate Drive,
Rexdale, Ontario, Canada
Filed Apr. 24, 1962, Ser. No. 189,725
15 Claims. (Cl. 88—24)

The present invention relates generally to photographic printing equipment, and more particularly to a projection easel for producing a plurality of positive prints on photographic printing paper for the purpose of affording a visual comparison between the duration of exposure of the various prints.

Various systems, procedures and methods for determining the optimum period of exposure for printing details of negatives have been proposed in the past. For example, moving an opaque masking element in a line along a sheet of printing paper during different exposure periods, rotating an L-shaped masking element on a sheet of printing paper, or using a separate sheet of printing paper for each test exposure.

Not only are the prior art procedures relatively awkward to accomplish in the dark room, but they are time consuming, subject to inaccuracies such as overlapping of differently exposed strips without delineating borders being well defined as well as being relatively expensive in the case of the last mentioned example.

Due to the recent and ever increasing interest in "do it yourself" photography, as well as the requirements of the professional photographer, there has been a need for a relatively simple and substantially automatic means for readily producing test strips.

A primay object of the present invention is to provide a novel semi-automatic photographic projection easel which overcomes all the disadvantages of the prior art, is readily used, relatively inexpensive and highly desirable and practical.

Another object of the present invention is to provide novel projection easel apparatus which is versatile in use and permits well delineated test strips to be produced; the test strips being automatically identified, specific details, i.e. eyes, etc. of a particular negative can be test exposed, and this can all be accomplished without disturbing the orientation of the printing paper with respect to the projected image of the enlarger or projector.

For the purpose of illustration, there is shown in the drawings a form which is presently preferred; it being understood that this showing is for purposes of illustration and the invention is not limited to the precise arrangements and instrumentalities shown.

Other objects and the nature and advantages of the instant invention will be apparent from the following description taken in conjunction with the accompanying drawings, wherein:

FIGURE 1 is a side elevational view showing the novel projection easel in use;

FIGURE 2 is an enlarged perspective view of the novel projection easel, showing how a sheet of photographic paper is inserted therein, emulsion side up;

FIGURE 3 is a fragmentary, exploded perspective view illustrating how the cooperating parts of the novel projection easel may be oriented for purposes of an alternate use differing from that available with the parts oriented as seen in FIGURE 2;

FIGURE 4 is a view similar to FIGURE 2 showing the manner in which the hinge-leaf levers are moved to cause relative movement between the masking frame and photographic paper on the projection easel;

FIGURE 5 is a diagrammatic perspective view showing one testing arrangement available through use of the novel apparatus;

FIGURE 6 is a view similar to FIGURE 5 showing another testing arrangement available by using the novel apparatus;

FIGURE 7 is a view similar to FIGURES 5 and 6 showing still another testing arrangement available by using the novel apparatus;

FIGURE 8 is an exploded perspective view looking at the upper surface of the support base of the novel apparatus and the undersurface of the reciprocal masking frame thereof;

FIGURE 9 is a vertical, longitudinal section taken substantially on the plane of line 9—9 of FIGURE 2, showing by phantom lines the zone of the projected image to be directed toward the reciprocal masking frame;

FIGURE 10 is a view similar to FIGURE 9, showing the relative position of the parts after the masking frame has been displaced one increment of movement;

FIGURE 11 is a vertical, transverse section taken substantially on the plane of line 11—11 of FIGURE 4, showing a fragmentary portion of the pivotal masking plate by means of phantom lines;

FIGURE 12 is a rear perspective view of the hinge-leaf lever assembly of the invention; and FIGURE 13 is a perspective view illustrating a test print upon which a plurality of progressively exposed test strips are illustrated.

It will be understood that various materials and assembly techniques may be used to produce the apparatus.

Referring to the drawings in detail, the novel projection easel apparatus is indicated generally at 10 and comprises a support base assembly indicated generally at 12 and masking frame assembly indicated generally at 14.

The novel apparatus will generally be used with a conventional projection enlarger 16 having a depending lens portion 17 for projecting an image onto an underlying horizontal projector base 18.

The support base 12 of the projection easel; see FIGURE 8, includes a planar base plate 19 having a pair of spaced, mutally parallel, vertical rib elements 20 and 22. The rib elements 20 and 22 respectively include upwardly opening notch portions 24 and 26 and 24', 26' adjacent the respective upper and lower ends thereof. The notch portion 24, 24' and 26, 26' are in transverse alignment, and indicia "1" and "2" are conveniently applied on the upper edges of the rib elements adjacent the upper and lower notches 24, 24' and 26, 26', respectively. The notches are conveniently described as orienting means on the base plate assembly 12.

The support base, as will subsequently become apparent, provides a fixed abutment against which the forces required to move the masking frame 14 will react.

The masking frame 14 comprises a rectangular base plate 28 having a width substantially conforming to the distance between the inner surfaces of the ribs 20, 22, the base plate including parallel, vertical side walls 30 and 32. The side walls 30 and 32 respectively include inwardly turned guide flange portions 34 and 36, respectively, which are spaced above and overly the upper surface of the base plate 28.

The base plate 28 and side walls 30, 32 are formed integrally with a vertical back wall 38 and an upper, vertically displaceable cover plate 40 which projects forwardly from the back wall 38 substantially parallel to the base plate 28 and forming a compartment 42 therebetween as seen in FIGURES 9 and 10.

The base plate 28 has secured on the upper surface thereof adjacent the inner surface of side walls 30, 32 flat spacer strips 44, 46, respectively, which are integral with a transverse plate portion 48 disposed substantially within the compartment 42. The strips 44, 46 and plate portion 48 are formed from a substantially U-shaped element opening toward the lower edge 50 of the base plate 28.

Secured in overlying relation on the strips 44, 46 and plate portion 48 is a second U-shaped element including legs 52, 54, integral with a transverse plate portion 56. The legs 52, 54 form inwardly extending flange portions 58, 60, respectively, and a transverse flange portion 62 forming a three-sided groove 64 which receives, and upon which is oriented the photographic printing paper P. The flange 58 has inscribed thereon numerical indicia 66 reading from 1–5, for example, and the flange 60 has inscribed thereon numerical indicia 68 reading from 1–10, for example. The area defined by the groove 64 encompasses 4 x 5 inches, and the indicia 66 are disposed at one inch increments and the indicia 68 are disposed at one-half inch increments. The element forming flanges 58, 60 and 62 is transparent, and the indicia 66 and 68 will be reproduced on the emulsion side of the printing paper P, and will aid in recording and tabulating the exposure data available through use of the apparatus. FIGURE 2 illustrates in phantom lines the manner in which the photographic paper is inserted in the groove 64.

The base plate 28 includes at opposite sides adjacent the upper edge laterally projecting lug elements 70 which have conveniently applied thereon numerical indicia "1." The lug elements 70 are removably received in the notches 24, 24' as seen in FIGURES 2 and 3, for example, for a purpose to subsequently be described in detail.

Reciprocally supported on the upper surface of the legs 52, 54 and plate portion 56 is a masking collar indicated generally at 71 and formed from an opaque material, the collar including legs 72 and 74 connected at the lower ends by strip 75 and at the upper ends by a plate portion 76; the masking collar substantially conforming to the dimensions of the element forming strips 44, 46 and plate portion 48. Projecting outwardly from the lower portions of legs 72 and 74 are lug elements 78 which are removably received in notches 26, 26'. The lug elements 78 have numerical indicia "2" inscribed thereon for a purpose to be described in detail.

Indicated generally at 80; see FIGURES 9, 10 and 12, is hinge-leaf assembly which consists of a vertical stack of nine plate elements 82. The lever plate elements are of progressively varying width from the lowermost lever plate element 82' which overlies the masking collar plate portion 76, substantially within the compartment 42, to the uppermost lever plate element 82". The forward edges of the lever plate elements are normally in vertically aligned relationship and the rear edges from the lever plate element 80' to 82" are staggered in one-quarter inch increments in the exemplary embodiment.

The rear edges or exposed upper surface portions of adjacent lever plate elements within compartment 42 are hingedly secured to each other by a flexible sheet element 84, the lower margin 86 of which being adhesively secured beneath the rear edge surface portion of masking collar plate portion 76. The upper marginal edge 88 of sheet element 84 is secured to the upper surface portion of lever plate element 82" disposed beneath the forward edge portion 90 of cover plate 40.

The upper surface of the lever plate element 82" has secured thereon a flexible strip element 92 which extends over edge 90 and is secured on the upper surface of the cover plate 40 rearwardly of edge 90 to hingedly connect lever plate element 82" to the cover plate.

Without describing the different testing arrangements afforded by the novel projection easel, when the lug elements 70 are positioned in notches 24, 24' ("1") and the levers 82", 82 and 82' are progressively pivoted in the manner illustrated in FIGURE 10, the masking collar 71 will move progressively downwardly in one-half inch increments i.e. equal to the spacing of indicia 68. If the lug elements 78 ("2") are disposed in notches 26, 26' ("2"), and the levers are pivoted in the manner mentioned above, the masking collar 73 will remain in a fixed position, and the base plate 28 and photo paper disposed in groove 64 will be progressively moved upwardly in one-half inch increments.

The cover plate 40 is resiliently connected to the upper edge of the vertical wall 38 to permit pivoting of the lever plate elements, the edge 90 providing the fulcrum for such pivoting.

Alternate lever plate elements starting from element 82" are notched as seen at 93 in FIGURE 2 and 4, to thus expose a portion 94 of the next underlying lever plate element. Numerical indicia 96 is provided on the right hand side of the lever plate elements, and this indicia conforms to indicia 68 on flange 60. The left hand side of alternate lever plate elements have indicia 98', i.e. reading 1–5 to conform to the similar indicia 66 on flange 58.

The lever plate elements can be readily manipulated beneath an enlarging projector and the numerical indicia 66, 68 will be printed during various test strip exposures being made.

Hingedly secured by means of a flexible strip element 100 on leg 72 of the masking collar 71 is an opaque masking plate 102 which substantially will overly legs 72 and 74 and mask the portions of the light sensitive photographic paper therebeneath. The upper edge 104 of plate 102 will normally be spaced one-half inch from the lower edge 106 of masking collar 71 to provide the exposure slot 108 seen in FIGURES 4, 6, 7, 9 and 10. The masking plate 102 includes a panel element 110 hingedly connected at 112 and foldable beneath the plate 102 to form a one inch exposure slot conforming to the spacing of indicia 66, i.e. this panel 110 is folded beneath plate 102 when every second lever panel element is pivoted and one inch increments of test strips are to be produced.

In order to facilitate raising of the masking plate 102, a convenient vertical lug element 114 can be provided thereon.

*Operation*

The disclosed embodiment of the projection easel will accommodate a sheet of photographic paper size 4 x 5 inches, which is conventional. In all arrangements to be subsequently described, the paper P will be inserted "emulsion side up" as inscribed on base plate 28, within the groove 64.

The base support 12 will be for example, normally secured by one of the adjustable paper holding arms on the support base 18 of the enlarging projector, and a portion of an image will be focused onto the masking plate 102 prior to exposing any paper P.

*Arrangement 1 (Figure 5)*

The masking panel 102 will be open as shown in FIGURES 2 and 5 and a full image will be projected onto the aperture formed by legs 72, 74, strip 75 and plate 76. The lug elements 70 will be disposed in notches 24, 24' and a first exposure of 3 seconds, for example, will be made.

The uppermost lever panel 82" will be pivoted as indicated in FIGURE 10 if one-half increments of movement or test strips are desired or the first two lever panels can be pivoted if one-inch increments are desired. When the lever panel 82" is pivoted as mentioned, the masking collar 71 will move one-half inch and the edge 106 will move down to blank out test strip "1" indicated at 68. Another exposure of 3 seconds will result in the remaining exposed paper P to receive 6 seconds of exposure, i.e. it is double exposed for the second 3 seconds.

Continued movement of the other levers will cause additional increments of movement, and any period of exposure can be adopted, i.e. 1, 2, or 3 second increments.

Considering FIGURE 13, for example, the photographic paper P will have projected thereon an image I which will be produced with graded intensity tones from strips 1–10, and the photographer can readily ascertain which time exposure is most particularly suited to the negative being printed. The more experienced photographer can use one inch exposure strips. This method is particularly suited for landscapes or the like where no highlighted or particular objects are the principal subject of the photograph. Since a constant exposure interval is used for the production of each test strip the photographer will not have to reset his exposure timer, and the production of a test print will be expedited.

*Arrangement II (Figure 6)*

The parts are positioned as in arrangement I, however, the masking panel 102 is closed as shown in FIGURE 4. The flap 110 will be positioned to produce one-half or one inch test strips. Since the panel 102 is closed, the aperture 108 will be the only portion of the image projected onto the test paper P.

In this arrangement, the lever panels 82", 82 and 82' are manipulated as previously mentioned, however, the exposure times will be altered.

Thus, as the lever panels are progressively pivoted during each controlled exposure period, the first period generally being slightly less than that recommended by the manufacturer, the negative will be projected onto that portion of paper P exposed to slot 108 as it is moved down the sheet of paper.

Arrangement II is probably more accurate by virtue of the controlled exposure times and would lend itself for use where color enlarging is being done, since accurate time exposure is critical.

*Arrangement III (Figure 7)*

In this arrangement lugs 78 will be positioned in notches 26, 26' and thus when the panel levers are pivoted, the masking collar 71 will be retained against movement by support base 12 and the paper P, i.e. base plate 28, etc. will be moved vertically the previously mentioned increments.

Since the portion of the negative projected onto aperture 108 will always be the same, i.e. the masking collar does not move, a highlighted portion, for example, a subject's eyes in a photograph, can be repeatedly reproduced as a test strip and the periods of exposure can be altered to obtain the optimum exposure time for the highlighted portion being considered.

Thus it will be observed that different arrangements of use of the novel projection easel will be available to the photographer, in order to produce different types of test strips. Only a single test sheet of photographic paper is used in the different arrangements for purpose of comparing the effect of different exposure times. The different test strips will be numbered and the size or width of the strips will be accurately and automatically produced.

It will be obvious to those skilled in the art that various changes may be made without departng from the spirit of the invention and therefore the invention is not limited to what is shown in the drawings and described in the specification, but only as indicated in the appended claims.

What is claimed is:

1. Projection easel apparatus for producing a plurality of strip enlargements of variable intensity comprising a support base assembly including orienting means for positioning a masking frame on said support base thereon, and a masking frame assembly removably received on said support base assembly, said masking frame assembly including a base plate including paper-receiving portions, a masking collar juxtaposed on said base plate and having reciprocal movement with respect to said base plate, and a pivotal lever assembly connected between said base plate and masking collar for affording and causing relative reciprocable movement between said base plate and collar, said masking frame assembly including an abutment portion engageable with said orienting means of said support base whereby relative movement will be afforded between said base plate and masking collar during operation of said pivotal lever assembly.

2. The structure of claim 1 wherein said support base assembly comprises spaced, parallel rib elements between which said masking frame assembly is received, said orienting means comprising a transverse notch portion in said rib elements for receiving the masking frame abutment portion therein.

3. The structure of claim 1 wherein said pivotal lever assembly comprises a juxtaposed stack of lever panel elements each hingedly connected to an adjacent lever panel element, said lever panel elements having different widths progressively increasing from top to bottom.

4. The structure of claim 3 wherein said base plate paper-receiving portions comprise substantially transparent flanges for receiving opposite edges of sensitized paper therebeneath, said flanges having spaced indicia thereon spaced in relation to the increment of relative movement provided by said lever panel elements.

5. The structure of claim 3 wherein alternate lever panel elements from top to bottom include a notch portion exposing a portion of the lever panel element therebeneath whereby two lever panel elements may be simultaneously pivoted for obtaining multi-incremental relative movement between said base plate and masking collar.

6. The structure of claim 1 wherein said base plate includes a vertically displaceable panel overlying portions of said pivotal lever assembly and to which said pivotal lever assembly is hingedly connected.

7. The structure of claim 1 wherein said support base assembly comprises spaced parallel rib elements between which said masking frame assembly is received, said orienting means comprising longitudinally spaced, transverse notch portions, said masking frame abutment portions comprising lug elements respectively projecting laterally from the lower end of said masking collar and the upper end of said base plate, the respective lug elements being removably receivable in one of said notch portions whereby relative movement between the base plate and masking collar may be afforded in one of two directions due to operation of said pivotal lever assembly.

8. The structure of claim 1 wherein said masking collar includes a displaceable masking panel for limiting the masking aperture of said masking collar.

9. The structure of claim 8 wherein said masking panel includes a foldable plate at one edge thereof and foldable therebeneath for increasing the exposure aperture.

10. For use in projection easel apparatus, a masking frame assembly comprising a base plate including a paper retaining portion, a masking collar juxtaposed on said base plate, and a pivotal lever assembly overlying one end of said base plate and masking collar and operatively connected thereto for causing relative movement between said base plate and masking collar.

11. The structure of claim 10 wherein said pivotal lever assembly comprises a juxtaposed stack of lever panel elements each hingedly connected to an adjacent lever panel element, said lever panel elements having different widths progressively increasing from top to bottom.

12. The structure of claim 11 wherein said base plate paper-receiving portions comprise substantially transparent flanges for receiving opposite edges of sensitized paper therebeneath, said flanges having spaced indicia thereon spaced in relation to the increment of relative movement provided by said lever panel elements.

13. The structure of claim 11 wherein alternate lever panel elements from top to bottom include a notch portion exposing a portion of the lever panel element therebeneath whereby two lever panel elements may be simultaneously pivoted for obtaining multi-incremental relative movement between said base plate and masking collar.

14. The structure of claim 10 wherein said masking collar includes a displaceable masking panel for limiting the masking aperture of said masking collar.

15. The structure of claim 14 wherein said masking panel includes a foldable plate at one edge thereof and foldable therebeneath for increasing the exposure aperture.

References Cited in the file of this patent

UNITED STATES PATENTS

| | | |
|---|---|---|
| 2,126,332 | Johnson | Aug. 9, 1938 |
| 2,212,834 | Kalish | Aug. 27, 1940 |

FOREIGN PATENTS

| | | |
|---|---|---|
| 498,009 | Great Britain | Dec. 29, 1938 |